US012144014B2

(12) United States Patent
Hathi et al.

(10) Patent No.: US 12,144,014 B2
(45) Date of Patent: Nov. 12, 2024

(54) RESOURCE UNIT PUNCTURING AND ALLOCATION BASED ON QUALITY METRICS

(71) Applicant: Arista Networks, Inc., Santa Clara, CA (US)

(72) Inventors: Preyas Satish Hathi, Pune (IN); Nadeem Akhtar, Navi Mumbai (IN); Jatin Parekh, Mumbai (IN); Anubhav Gupta, Navi Mumbai (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 406 days.

(21) Appl. No.: 17/733,416

(22) Filed: Apr. 29, 2022

(65) Prior Publication Data
US 2023/0354397 A1    Nov. 2, 2023

(51) Int. Cl.
*H04W 72/542* (2023.01)
*H04W 72/566* (2023.01)

(52) U.S. Cl.
CPC ....... *H04W 72/542* (2023.01); *H04W 72/569* (2023.01)

(58) Field of Classification Search
None
See application file for complete search history.

(56) References Cited

U.S. PATENT DOCUMENTS

| | | | |
|---|---|---|---|
| 2018/0020367 A1* | 1/2018 | Hsu | H04W 48/18 |
| 2022/0376823 A1* | 11/2022 | Vagner | H04B 7/0639 |
| 2023/0239239 A1* | 7/2023 | Yerramalli | H04W 40/02 370/328 |

* cited by examiner

*Primary Examiner* — Shripal K Khajuria
(74) *Attorney, Agent, or Firm* — Fountainhead Law Group, PC

(57) ABSTRACT

Systems, methods, and computer-readable media are disclosed for applying quality metrics for resource unit (RU) allocation in connection with a wireless access point (AP). In response to detecting threshold utilization of an AP by multiple wireless clients, an RU score is initialized. For each initialized RU score, an updated RU score is periodically computed. To perform this computation several steps are performed. First, RU quality metrics are received. Next, each quality metric is multiplied by an associated weighting coefficient. Finally, the quality products are summed to provide an updated RU score. In response to determining that a puncture candidate RU has a puncture candidate RU score below a predetermined threshold, one or more RUs are punctured or otherwise de-prioritized. A request to assign new RUs is received. In response to the request to assign the new RUs, the new RUs are assigned based on the periodically updated RU scores.

20 Claims, 6 Drawing Sheets

RESOURCE UNIT PUNCTURING AND ALLOCATION BASED ON QUALITY METRICS

BACKGROUND

Under the 802.11be standard, a wireless access point (AP) operating at 40 MHz, or higher channel bandwidths, can "puncture" or blank out one or more resource units (RU) in associated component 20 MHz channels, which is to say the punctured RU will not be assigned to a client or used for the time that the RU is punctured. Puncturing can be used to address several problems. Puncturing one or more RUs can help avoid persistent non-WiFi interference on specific parts of the channel bandwidth utilized by an AP. Such interference may be caused by non-WiFi spectrum utilization such as Bluetooth® or radar on specific portions of a channel. Additionally, very high WiFi utilization in parts of a channel, i.e., from one or more other APs, may cause those parts of the channel to be so congested that wireless communication is degraded. By puncturing RUs in the channel, the AP can avoid using low-quality RUs, thereby avoiding a need to change channels because of wireless interference. While the Institute of Electrical and Electronics Engineers (IEEE) 802.11be standard allows puncturing, the standard does not provide for any mechanism to determine which RUs or channels to puncture or prioritize for assignment. Accordingly, a need exists for a mechanism to provide for a determination regarding which RUs or channels to puncture and/or prioritize for assignment.

BRIEF DESCRIPTION OF THE DRAWINGS

With respect to the discussion to follow, and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Overview

Figure 1:
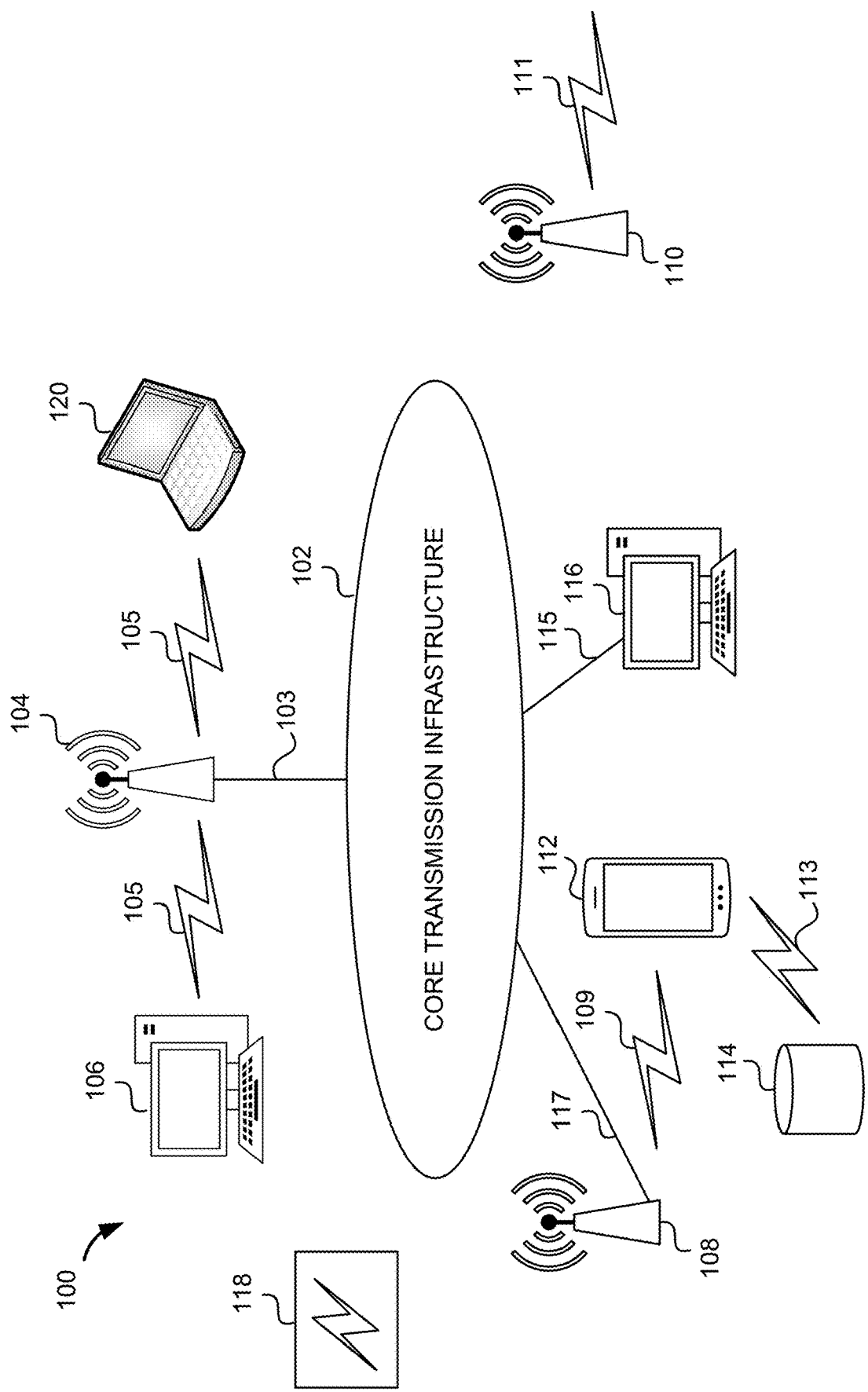
FIG. 1 illustrates a local area network (LAN) in which example APs may operate according to one or more embodiments.

The present disclosure is directed to using quality metrics for RU puncturing and allocation in connection with a wireless AP. The present disclosure describes mechanisms to identify RUs that are experiencing interference and hence, should be punctured at least on a temporary basis by evaluating various wireless communication quality metrics. Such quality metrics include packet error rate (PER), signal to noise ratio (SNR), and RU utilization. PER may be calculated for every RU and for uplink (UL) and downlink (DL) by dividing the number of failed packets by the total number of packets exchanged on a particular RU over a period of time. SNR is a ratio of signal power to noise power and may be computed at the AP for the uplink (UL-SNR) by measuring noise power on the RU received by the AP. DL-SNR may be measured by a client and included in subsequent communications with the AP as a channel quality indicator (CQI) measurement. Utilization is a metric that is available at an AP as a particular AP already has knowledge of how much airtime each RU uses within its own cell. An AP can gather information about per-RU utilization of other co-channel APs via over-the-air measurements or obtain this data from neighbor APs directly.

An AP computes each quality metric periodically, over a measurement interval and separately for the downlink and uplink. These metrics are based on performance measurements computed for each connected client that meets certain conditions. Performance measurement tabulation begins when a threshold number of clients connect to an AP during a certain time period. Similarly, performance measurements will be tabulated only for clients that exchange at least a threshold number of packets over a period of time. Multiple measurements from the same client in a measurement interval are considered independent of each other because wireless link conditions vary over time. Each metric is then assigned a score, which scores are tabulated for both uplink and downlink to provide RU scores.

RU scores are used to determine whether to puncture an RU and to prioritize assignment of highest link quality RUs first. A worked example follows. First each RU score entry is initialized to the highest score value. For each direction (UL and DL) and each time interval, certain calculations are performed. First, a per-RU score is calculated as the sum of weighted quality metric scores, by multiplying a weighting coefficient to the quality metrics before summing. In some embodiments, the weighting coefficients are assigned values based on a number of metrics available in a particular measurement interval. For a given measurement interval, an AP might not have the score for one or more of the metrics. For example, an AP might not have the DL SNR if it does not receive CQI measurements in that interval.

In RU score calculations, weighting coefficients may be chosen such that equal weight is assigned to each available metric. Alternatively, certain metrics may be given a higher weight. In some embodiments the weighting coefficients are configurable by an administrator of the AP. In some other embodiments, the weighting coefficients are adjusted dynamically (e.g., in connection with machine learning) based on the nature of the wireless interference being experienced and based on how computing scores in a certain way affects real world performance of the AP. For example, given certain types of traffic and wireless interference, the disclosed mechanisms may perform better by more heavily weighting SNR than utilization. RUs may be punctured based on configurable score thresholds. RUs may be assigned by prioritizing the best scores. If an AP finds that too many RUs are bad on its current channel, the AP could trigger dynamic channel selection (DCS) to select a channel having less wireless interference.

DESCRIPTION OF EMBODIMENTS

FIG. 1 illustrates a local area network (LAN) 100 in which example APs may operate according to one or more embodiments. In LAN 100, core transmission infrastructure 102 can include various transmission components, e.g., Ethernet cables, hubs, routers and/or switches. In a typical deployment, core transmission infrastructure 102 may comprise one or more network segments. A network segment refers to an Internet Protocol or IP "subnetwork" (subnet). Each subnet is identified by a network number (e.g., IP number and subnet mask) and plurality of subnets are interconnected using router devices. A network segment may refer to a virtual local area network (VLAN) segment and plurality of VLANs can be interconnected using switches (e.g., Ethernet switches). Other embodiments of network segments are also possible. Notably, a plurality of network segments of LAN 100 may be geographically distributed (e.g., in offices of a company in different geographic locations). The geographically distributed segments can be interconnected using a virtual private network (VPN).

One or more connection ports (e.g., Ethernet sockets) are provided on each of the segments for connecting various computer systems to LAN 100. Thus, one or more end user devices such as desktop 116 may be connected to LAN 100 via one or more connection ports 115 using wires (e.g., Ethernet cables) or other suitable connection means. Other computer systems that provide specific functionalities and services can also be connected to LAN 100. For example, one or more database computers (e.g., computers storing customer accounts, inventory, employee accounts, financial information, etc.) may be connected to LAN 100 via one or more connection ports. Additionally, one or more server computers (computers providing services, such as database access, email storage, HTTP proxy service, DHCP service, SIP service, authentication, network management, etc.) may be connected to LAN 100 via one or more additional connection ports.

Wireless access points such as AP 104 may be directly connected to LAN 100 via connection port 103. In this case, AP 104 may perform necessary security procedures (such as authentication, encryption, firewall, etc.). In this configuration, one or more end user devices (such as desktop computer 106, laptop computer 120, handheld device 112, or any other computerized end user device) equipped with radio communication capability can wirelessly connect to LAN 100 via APs such as AP 104 and AP 108, which may be directly connected to LAN 100 via connection port 117. APs connected to LAN 100 provide wireless connection points on the LAN. Note that WiFi or another type of wireless network format (e.g., UWB, WiMax, Bluetooth, etc.) can be used to provide the wireless protocols.

FIG. 1 also depicts foreign AP 110 whose radio coverage 111 spills into the region of operation of the concerned LAN. According to a specific embodiment, the AP 110 can be an AP in the neighboring office (or residence) that is connected or unconnected to the neighbor's LAN, an AP on the premises of LAN 100 that is not connected to the LAN 100 and other APs, which co-exist with the LAN and share the airspace without any significant and/or harmful interferences. Foreign AP 110 may be misconfigured or otherwise creating undesired wireless interference with the APs that are connected to LAN 100. Similarly, one or more wireless interference sources, such as wireless interference source 118 may be appliances that generate electromagnetic radiation in an overlapping spectrum with the APs of LAN 100. Interference source 118 may be an appliance such as a microwave oven, a Bluetooth device, such as Bluetooth device 114 which communicates with handheld device 112 over Bluetooth connection 113 or another type of device that generates relevant wireless interference. In some cases, this wireless interference may be associated with radar signals present in the region of operation of LAN 100. Interference sources such as interference source 118, may prevent proper operation of the APs of LAN 100 in certain channels and/or associated RUs.

Figure 2:
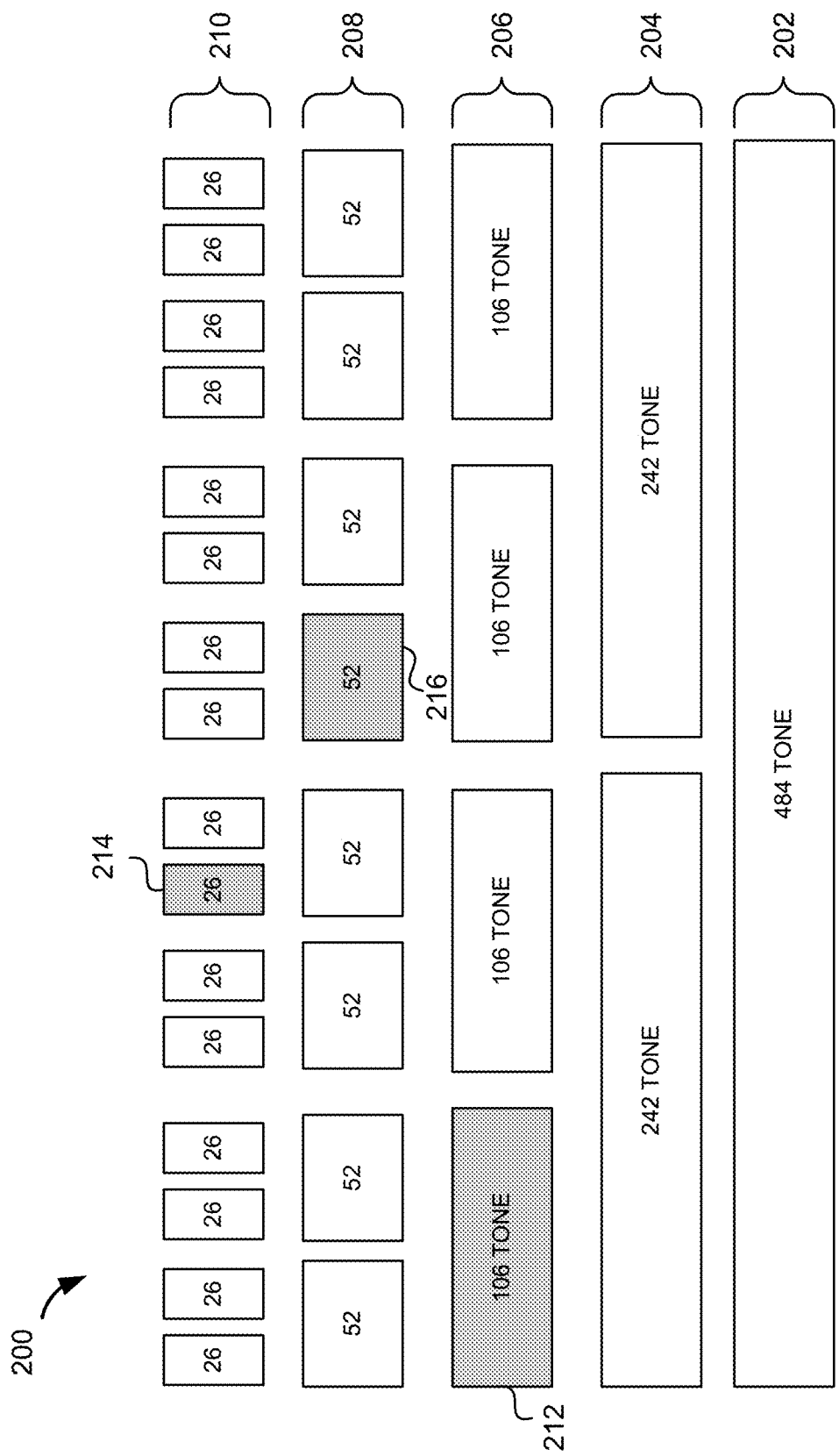
FIG. 2 illustrates an example RU allocation mapping according to one or more embodiments.

FIG. 2 illustrates an example 40 MHz bandwidth RU allocation mapping 200 according to one or more embodiments. Orthogonal frequency division multiple access (OFDMA) permits dividing a wireless channel into smaller RUs of different sizes. Examples of such different sizes are shown in connection with RU allocation mapping 200. A Wi-Fi AP capable of using the 802.11ax, or higher, standard compatible protocol can communicate with multiple clients while allocating different RUs to the clients. The 802.11ax version restricted RU allocation to one RU per client in a single OFDMA frame. The 802.11be standard supports flexible allocation of multiple resource units (MRUs) of different sizes to a client in a single OFDMA frame. A Wi-Fi channel may be constructed by one or more 20 MHz channels, by repeatedly doubling the channel width, resulting in a channel width of 40, 80, 160, or 320 MHz.

A largest RU allocation 202 would use the entire 40 MHz bandwidth, providing an RU made up of 484 subcarriers (or tones). Allocating such a full-bandwidth RU to a single client would involve dedicating the full channel to a single client. Alternatively, smaller RUs may be allocated as in the case of 242 tone RU 204. Multi-client allocations may, for example, involve allocating 242 tone RU 204 to a particular client and one or more other RUs to additional clients, such as 106 tone RU 206, 52 tone RU 208, or in this 40 MHz example the smallest RU, which is 26 tone RU 210. For example, in connection with an AP that allocates 52-tone RU such as 52 tone RU 208 for its 40-MHz bandwidth, eight clients can transmit and/or receive simultaneously to the AP. In this case, each RU uses 52-tones, where the total bandwidth for all clients must be less than or equal the full 40-MHz allocated bandwidth. Where there is only one client connected to the AP, the AP can dedicate the whole 40-MHz bandwidth by operating at 484-tone RU to achieve a higher data rate.

When operating at 40 MHz or higher bandwidths, an AP is often faced with interference which affects only some of the component sub-channels. For example, there might be severe non-WiFi interference in one portion of the component channels. One approach to avoiding such interference is to switch channels, for example by performing a dynamic channel selection (DCS). However, performing a DCS is a disruptive event since connected clients are disconnected during this process and must reconnect after the DCS process is complete. The example RU allocation mapping 200 of FIG. 2 contains three punctured RUs, namely punctured 106 tone RU 212, punctured 26 tone RU 214, and punctured 52 tone RU 216. By puncturing these RUs, an AP consistent with the present teachings may avoid using RUs that are experiencing levels of interference that are sufficient to degrade performance of the AP in those RUs.

Figure 3:
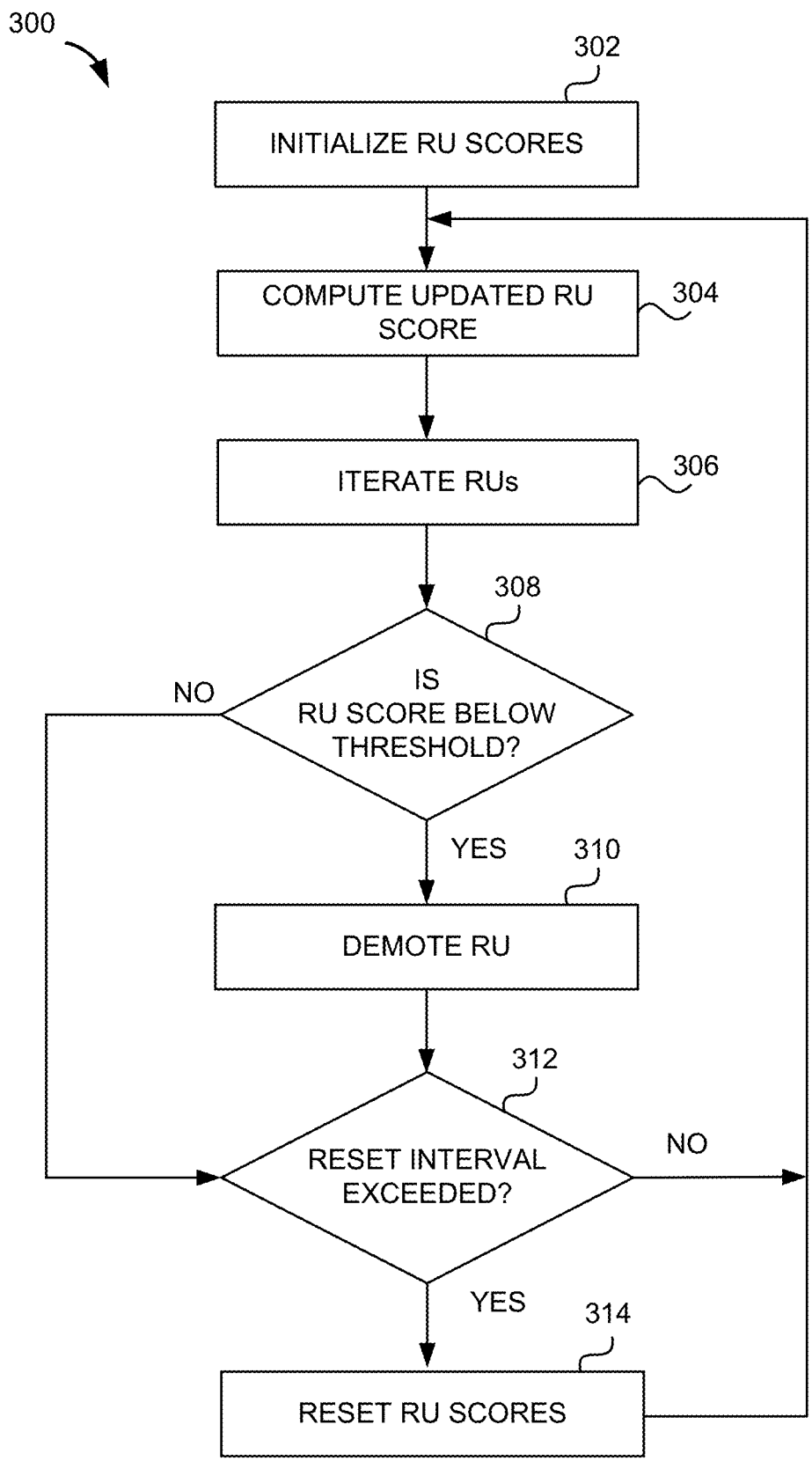
FIG. 3 illustrates an example method for computing updated RU scores according to one or more embodiments.

FIG. 3 illustrates an example method 300 for computing updated RU scores according to one or more embodiments. In some embodiments, a computer-implemented method is provided for applying quality metrics for RU prioritization in connection with an AP. RU scores may be constructed using a weighted composition of various wireless network performance quality metrics. At step 302, RU scores are initialized for each RU in the plurality of RUs. In some embodiments, the RU scores are initialized to a highest RU score, which may be, for example the value 2. This initialization step may be performed, in response to detecting threshold utilization of an AP by a plurality of wireless clients. For example, when an AP is initially powered on and/or no clients are connected to the AP, the AP need not yet initialize RU scores. However, once a predetermined threshold number of clients have connected to the AP, the AP may initialize RU scores. Similarly, if a number of clients connected to an AP drops below the predetermined threshold number and then the number of connected clients subsequently exceeds the predetermined threshold number, initialization of RU scores may be performed again upon the threshold being exceeded. In some embodiments, the predetermined threshold number is a configuration parameter within a particular AP. In some other embodiments, the predetermined threshold number is dynamically calibrated based on ambient network conditions to optimize performance of the AP based on radio interference conditions.

Next at step 304, an updated RU score is periodically computed at an RU score measurement interval. This computing step may be performed for each initialized RU score by periodically monitoring network quality metrics associated with each RU associated with an AP operating on a particular channel. In some embodiments, the step of computing updated RU scores comprises various sub-steps. First, one or more RU quality metrics are received, calculated, or otherwise derived from information contained in volatile memory of the AP.

Quality metrics such as PER, SNR, and RU utilization may be employed. UL-PER and DL-PER may be determined by dividing the number of failed packets by the total number of packets exchanged on a particular RU. SNR represents a ratio of signal power to noise power and may be computed at the AP for the uplink (UL-SNR) by measuring noise power on the RU received by the AP. DL-SNR may be measured by a client and included in subsequent communications with the AP as a CQI measurement. Utilization is available at an AP as a particular AP already has knowledge of how much airtime each RU uses within its own cell. An AP may gather information about per-RU utilization of other co-channel APs via over-the-air measurements or obtain this data from neighbor APs directly. Next, each quality metric is multiplied by an associated weighting coefficient to provide one or more quality products. The quality metrics to be used may be specified in connection with a configuration of a particular AP or applied dynamically based on one or more machine learning models. Such machine learning models may be trained in connection with simulated network interference scenarios, or the machine learning models may be adaptively refined in connection with real-world operation of a particular AP based on improving performance in the context of similar types of interference that have been experienced in the past by the particular AP. Finally, the one or more quality products are summed together to provide the updated RU score. In an embodiment, updated RU scores are calculated independently in each updated calculation based solely on current quality metrics. In some other embodiments, the updated RU scores reflect a moving average of the current quality metrics as well as a window of past quality metrics so that recurring interference is reflected in the RU score even if at a particular instant in time a particular RU has high quality metrics. At step 306, the process iterates over a plurality of the RUs in use by a particular AP. The plurality of the RUs in use by a particular AP may include all of the RUs in the currently active channel or channels. Alternatively, the plurality of the RUs in use by a particular AP may be just those RUs that are not currently punctured.

Next at test 308, it is determined whether a particular RU has an RU score below a predetermined threshold. In some embodiments, the RU is a puncture candidate RU, and the predetermined threshold is a predetermined puncture threshold. The predetermined puncture threshold may be specified in connection with a configuration of a particular AP or applied dynamically based on one or more machine learning models, which models may be trained in connection with simulated network interference scenarios. The puncture threshold values may be adaptively refined in connection with real-world operation of a particular AP based on whether a non-punctured RU experienced sufficient interference so as not to operate effectively in the context of similar types of interference that have been experienced in the past by the particular AP on a particular RU, for example.

If in connection with test 308, the RU score is determined to be below the predetermined puncture threshold, execution proceeds to step 310. At step 310, the puncture candidate RU is demoted. Such demotion may be a puncture of the RU. Alternatively, a puncture candidate RU may need to be demoted multiple times in order to be punctured. If on the other hand, the RU score is determined not to be below the predetermined threshold, the candidate RU is not punctured or demoted, and execution proceeds to optional test 312. Next, at optional test 312, it is determined whether a reset interval has been exceeded. In some embodiments, a reset interval associated with the plurality of updated RU scores is an integer multiple of a period corresponding to an RU score measurement interval. A reset interval may be employed to reset the RU scores and to optionally allow allocation of RUs that are no longer experiencing interference high enough to puncture the RUs. Furthermore, even RUs that are not punctured may benefit from a reset to the maximum RU score value, for example if moving averages are employed in connection with certain quality metrics and a particular source of interference has ceased to generate interference.

If in connection with optional test 312, the reset interval is exceeded, execution proceeds to optional step 314. At optional step 314, RU scores are reset. In some embodiments resetting RU scores involves initializing RU scores. In some other embodiments, resetting RU scores involves calculating fresh RU scores based on quality metrics that do not involve moving averages of past quality metrics. In some embodiments, resetting RU scores involves allowing allocation of all previously punctured RUs or just the RUs that have not been punctured on a predetermined number of past reset cycles. In this way, a persistently punctured RU can be excluded from repeated reset-puncture cycles. If on the other hand, the reset interval is not exceeded, RU scores are not reset, and execution proceeds back to step 304. In some embodiments, periodically updated RU scores are aggregated to provide an aggregated channel score for active RUs in a currently used wireless channel so that in response to determining that the aggregated channel score is below a predetermined threshold a dynamic channel selection process (DCS) may be initiated. As previously noted, a DCS is a disruptive process for clients currently connected to an AP, however, if interference is so persistent on a particular channel that many RUs must be repeatedly punctured or even if a majority of RUs are close to a puncture threshold, an associated level of improved performance of many RUs may justify carrying out a DCS.

Figure 4A:
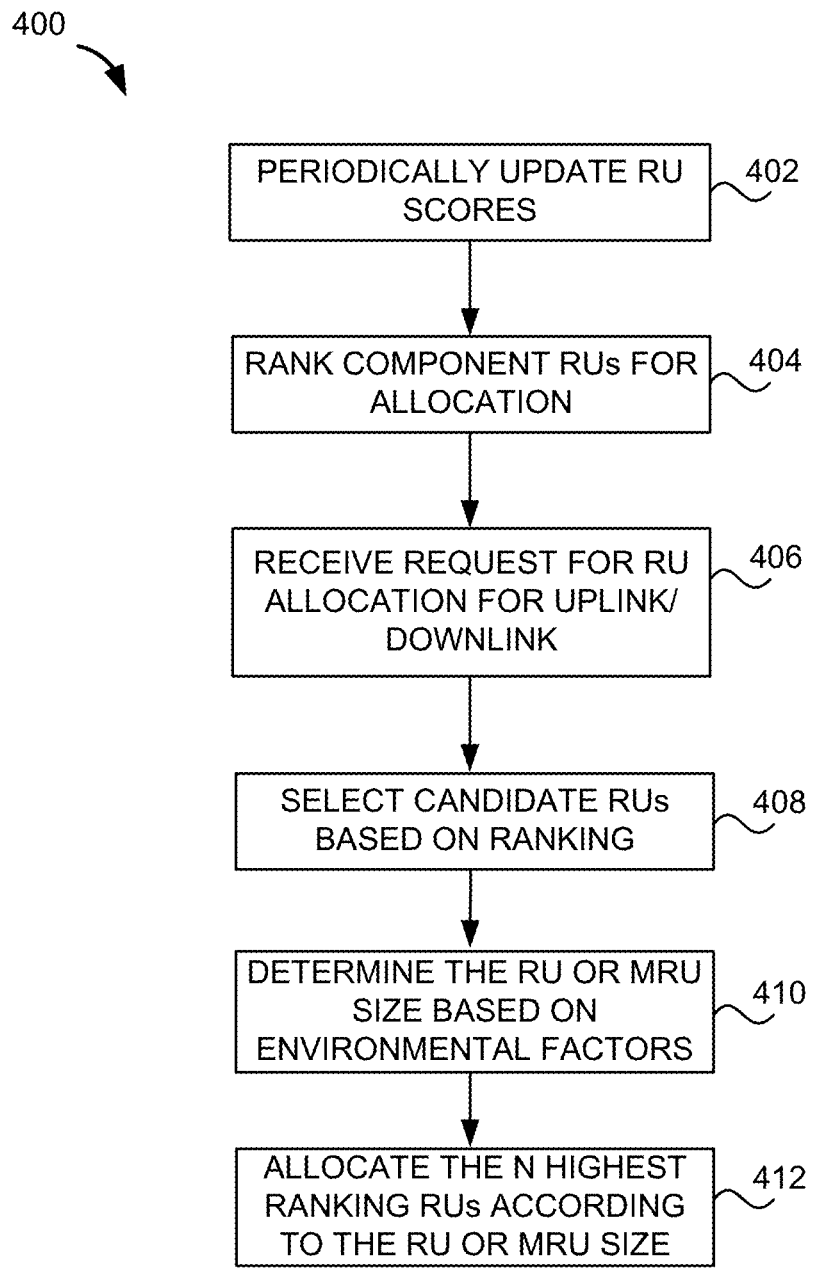
FIG. 4A illustrates an example method for allocating RUs to wireless clients according to one or more embodiments.

FIG. 4A illustrates an example method 400 for allocating RUs to wireless clients according to one or more embodiments. At step 402, scores associated with RUs are updated. This RU score updating step may be performed for each RU by periodically monitoring network quality metrics associated with each RU associated with an AP operating on a particular channel. In a particular measurement interval, an AP may update all RU scores for which quality metrics are available, regardless of whether corresponding RUs are currently assigned. These RU scores influence subsequent allocation, therefore there is a benefit to calculating scores for currently allocated RUs. In some embodiments, the step of updating RU scores comprises various sub-steps. First, one or more RU quality metrics are received, calculated, or otherwise derived from information contained in volatile memory of the AP. As noted above, quality metrics such as PER, SNR, and RU utilization may be employed. Next, each quality metric is multiplied by an associated weighting coefficient to provide one or more quality products. The quality metrics to be used may be specified in connection with a configuration of a particular AP or applied dynamically based on one or more machine learning models. Finally, the one or more quality products are summed together to provide the updated RU score.

Next, at step 404, component RUs that may be used to form an MRU are ranked so that they may be assigned to a particular client. This ranking may be accomplished by ordering RUs according to RU score. Next, at step 406, a software component within an AP receives a request for RU allocation for an uplink or downlink with one or more clients. In some embodiments, an AP determines how many RUs to aggregate into an MRU based on various factors associated with data that needs to be sent to or received by the AP in connection with a particular client. Such factors may be associated with a public standard or be proprietary and may include uplink and/or downlink buffer size, channel conditions, or other characteristics of a particular client to which the AP is maintaining a connection. Next, at step 408, an AP selects candidate RUs for assignment. When assigning component RUs, an AP may sort RUs based on respective RU scores, selecting the highest-ranking component RUs for allocation. At step 410, the RU or MRU size is determined based on environmental factors, which as described above may relate to buffer sizes, channel conditions, and various outer client-related factors. Finally, at step 412, the AP may allocate the N highest-ranking RUs, where N is chosen according to the RU or MRU size determined at step 410 above.

Figure 4B:
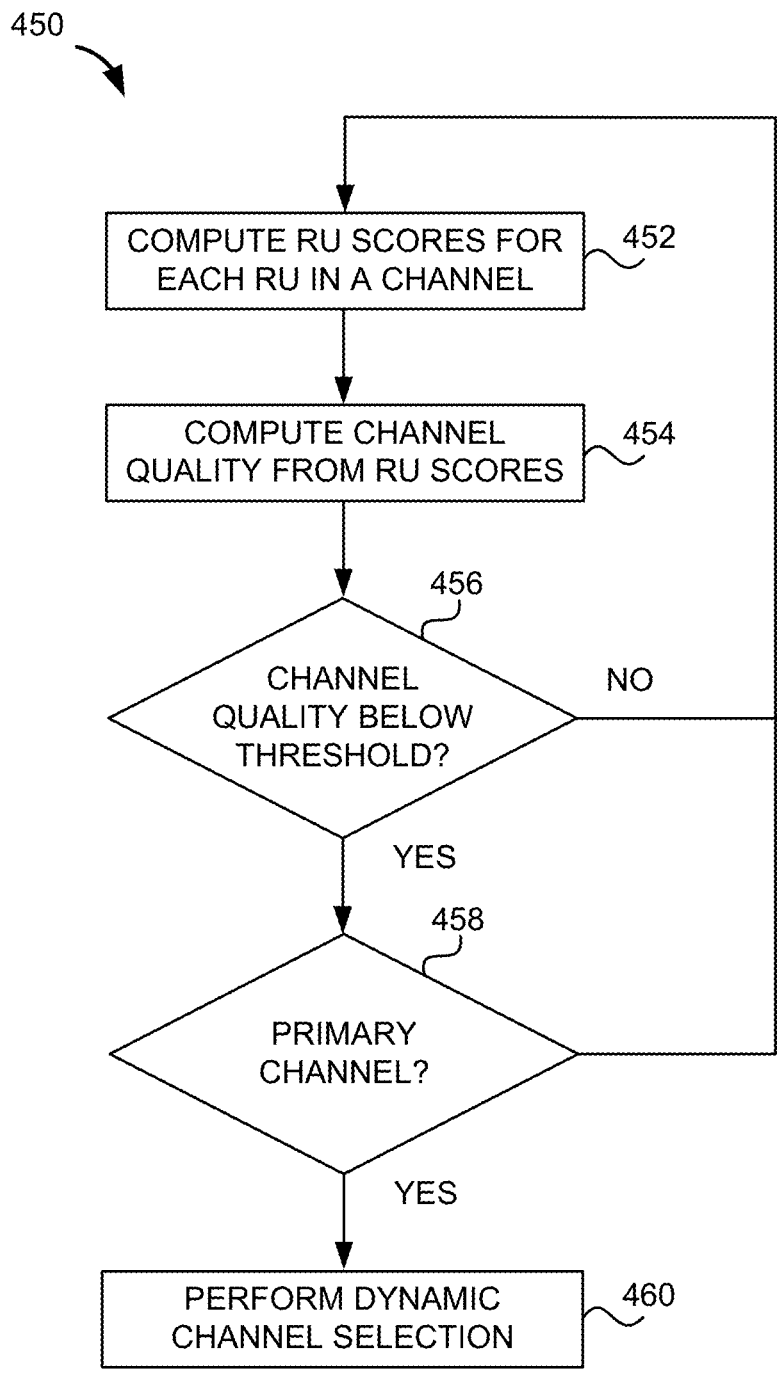
FIG. 4B illustrates an example method for determining when to perform dynamic channel selection according to one or more embodiments.

FIG. 4B illustrates an example method 450 for determining when to perform dynamic channel selection according to one or more embodiments. At step 452, RU scores are computed for each RU in a channel. Next, at step 454, one or more channel quality metrics is computed based on component RU scores, which RU scores may be calculated as described above. Next, at test 456, it is determined whether channel quality is below a particular threshold. In some embodiments, a binary channel quality metric (CQ) is calculated for each component 20 MHz channel, where CQ=1 for a usable channel and CQ=0 for an unusable channel. The AP may compute CQ as an average of the 9 RU quality scores in each 20 MHz channel (since a 20 MHz channel is made up of 9 RUs). In some embodiments, if more than half the RUs are considered to be sufficiently suboptimal, i.e., the corresponding RU score is below a predetermined threshold, the AP assigns a channel quality CQ=0 to that 20 MHz channel. If a given 20 MHz channel has a CQ value of 0 for a certain number of cycles, the AP may deem that channel to be unusable.

Under various WiFi standards, an AP operates on a primary channel with an adjacent secondary channel. The primary channel is the main signaling channel between an AP and a client. In particular, the primary channel is used by the AP to advertise and/or broadcast a WiFi network name, i.e., service set identifier (SSID) via a "beacon." Clients use the beacon to understand basic operating parameters of an AP having a certain SSID, so that the clients can request connections. If as determined at test 458, the primary channel of the AP is unusable, the AP triggers DCS (step 460). In some embodiments, even if the primary channel is not unusable, if more than half of the channels are unusable, DCS (step 460) may similarly be performed by the AP.

Figure 5:
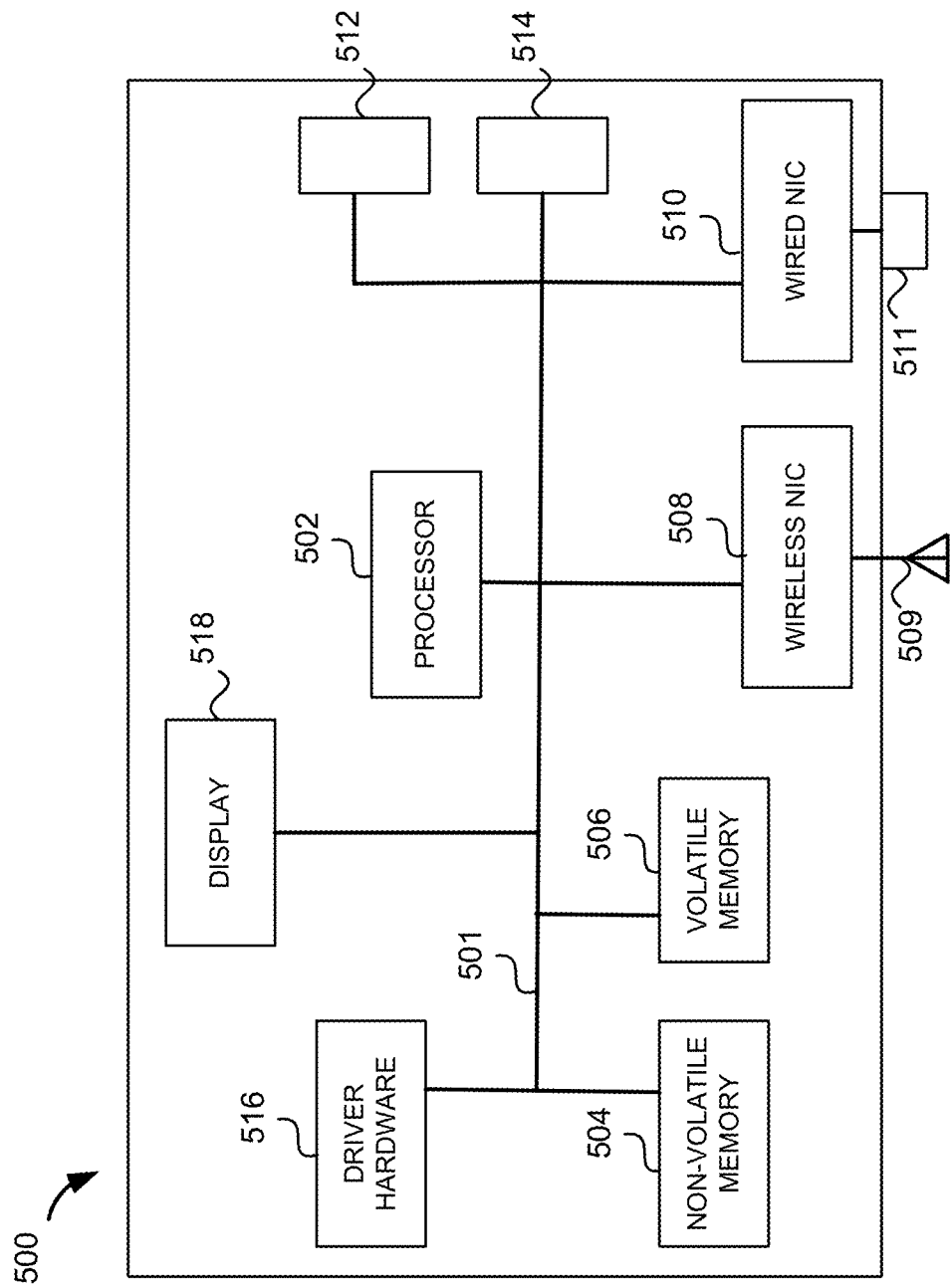
FIG. 5 illustrates an example AP hardware platform according to one or more embodiments.

FIG. 5 illustrates an example AP hardware platform 500 according to one or more embodiments. As shown, to provide the desired functionality, AP 500 employs one or more processors 502, media such as non-transitory, non-volatile memory 504, where computer executable instructions for implementing AP functionality resides, and non-transitory, volatile memory 506 which provides volatile storage for use by the one or more processors 502, during program execution. AP hardware platform 500 may also employ one or more wireless network interface cards (NICs) 508 which perform radio and wireless MAC layer functionality and one or more of dual band (i.e., for transmission detection in both the 2.4 GHz and 5 GHz radio frequency spectrums). The one or more wireless NICs 508 may implement one or more versions of the IEEE 802.11 standard in connection with one or more antennas 509 coupled to the wireless NICs. In some embodiments, each of the wireless NICs 508 can operate in one or more modes associated with particular versions of the IEEE 802.11 standard. Moreover, AP hardware platform 500 may also include a wired NIC 510 which may perform Ethernet physical and MAC layer functions, an Ethernet jack 511 such as RJ-45 socket coupled to wired NIC 510 for connecting AP 500 to a wired LAN with optional power over Ethernet or POE. AP hardware platform 500 may also include serial port 514 which can be used to flash/configure/troubleshoot AP hardware platform 500. A power input 512 may also be provided to provide power by way of combined power and communication bus 501. One or more light emitting diodes (LEDs), not shown, may be provided on AP 500 to convey visual indications (such as device working properly, error condition, unauthorized wireless device alert, and so on) being driven by LED driver hardware 516. In some embodiments, AP includes display 518 in addition to, alternatively to the one or more LEDs. Display 518 may be any kind of graphical display for displaying text and/or graphics, such as a graphical touch screen display for configuring or otherwise interacting with AP hardware platform 500.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Having thus described various embodiments of the invention, what is claimed as new and desired to be protected by Letters Patent includes the following:

The invention claimed is:

1. A computer-implemented method for applying quality metrics for resource unit (RU) allocation of a plurality of RUs in connection with a wireless access point (AP), the method comprising:
for each RU score, periodically computing an updated RU score, at an RU score measurement interval, to provide a plurality of periodically updated RU scores, the computing comprising:
receiving one or more RU quality metrics;
multiplying each quality metric in the one or more RU quality metrics by an associated weighting coefficient to provide one or more quality products; and
summing the one or more quality products to provide the updated RU score;
in response to determining that a puncture candidate RU has a puncture candidate RU score below a predetermined puncture threshold, puncturing one or more RUs associated with the puncture candidate RU score;
receiving a request to assign one or more new RUs; and
in response to the request to assign the one or more new RUs, assigning the one or more new RUs based on the plurality of periodically updated RU scores.

2. The method of claim 1, further comprising:
in response to detecting threshold utilization of an AP by a plurality of wireless clients, initializing an RU score for each RU in the plurality of RUs;
aggregating the plurality of periodically updated RU scores to provide an aggregated channel score for active RUs in a currently used wireless channel; and
in response to determining that the aggregated channel score is below a predetermined dynamic channel selection threshold initiating a dynamic channel selection process.

3. The method of claim 1, wherein initializing the RU score for each wireless client comprises initializing the RU score to a maximum value.

4. The method of claim 1, wherein a reset interval associated with the plurality of updated RU scores is an integer multiple of the RU score measurement interval.

5. The method of claim 4, further comprising:
resetting each of the plurality of updated RU scores based on the reset interval.

6. The method of claim 5, wherein resetting each of the plurality of updated RU scores comprises initializing the RU score to a maximum value.

7. The method of claim 1, wherein the predetermined puncture threshold is determined dynamically.

8. One or more non-transitory computer-readable media storing computer-executable instructions that, when executed by a processor, perform a method of applying quality metrics for resource unit (RU) allocation of a plurality of RUs in connection with a wireless access point (AP), the method comprising:
for each RU score, periodically computing an updated RU score, at an RU score measurement interval, to provide a plurality of periodically updated RU scores, the computing comprising:
receiving one or more RU quality metrics;
multiplying each quality metric in the one or more RU quality metrics by an associated weighting coefficient to provide one or more quality products; and
summing the one or more quality products to provide the updated RU score;
receiving a request to assign one or more new RUs; and
in response to the request to assign the one or more new RUs, assigning the one or more new RUs based on the plurality of periodically updated RU scores.

9. The one or more non-transitory computer-readable media of claim 8, wherein the method further comprises:
in response to detecting threshold utilization of an AP by a plurality of wireless clients, initializing an RU score for each RU in the plurality of RUs; and
in response to determining that a puncture candidate RU has a puncture candidate RU score below a predetermined threshold, puncturing one or more RUs associated with the puncture candidate RU score.

10. The one or more non-transitory computer-readable media of claim 9, wherein the predetermined puncture threshold is determined dynamically.

11. The one or more non-transitory computer-readable media of claim 8, wherein initializing the RU score for each wireless client comprises initializing the RU score to a maximum value.

12. The one or more non-transitory computer-readable media of claim 11, wherein a reset interval associated with the plurality of updated RU scores is an integer multiple of the RU score measurement interval.

13. The one or more non-transitory computer-readable media of claim 12, wherein the method further comprises:
resetting each of the plurality of updated RU scores based on the reset interval.

14. The one or more non-transitory computer-readable media of claim 8, wherein resetting each of the plurality of updated RU scores comprises initializing the RU score to a maximum value.

15. A system for applying quality metrics for resource unit (RU) allocation of a plurality of RUs in connection with a wireless access point (AP), the system comprising:
a processor; and
one or more non-transitory computer-readable media storing computer-executable instructions that, when executed by the processor, perform a method comprising:
for each RU score, periodically computing an updated RU score, at an RU score measurement interval, to provide a plurality of periodically updated RU scores, the computing comprising:
receiving one or more RU quality metrics;
multiplying each quality metric in the one or more RU quality metrics by an associated weighting coefficient to provide one or more quality products; and
summing the one or more quality products to provide the updated RU score;
aggregating the plurality of periodically updated RU scores to provide an aggregated channel score for active RUs in a currently used wireless channel; and
in response to determining that the aggregated channel score is below a predetermined threshold initiating a dynamic channel selection process.

16. The system of claim 15, wherein the aggregated channel score is a binary channel quality metric to which a first value is assigned for a channel that is deemed to be usable and to which a second value is assigned for a channel that is deemed to be unusable.

17. The system of claim 15, wherein initializing the RU score for each wireless client comprises initializing the RU score to a maximum value.

18. The system of claim 17, wherein a reset interval associated with the plurality of updated RU scores is an integer multiple of the RU score measurement interval.

19. The system of claim 18, further comprising:
resetting each of the plurality of updated RU scores based on the reset interval.

20. The system of claim 19, wherein resetting each of the plurality of updated RU scores comprises initializing the RU score to a maximum value.

* * * * *